United States Patent
Gottwald

(10) Patent No.: US 7,079,766 B2
(45) Date of Patent: Jul. 18, 2006

(54) METHOD FOR SPLITTING AN OPTICAL SIGNAL INTO A NUMBER OF ELECTRICAL DATA SIGNALS WITH LOWER BIT RATES

(75) Inventor: Erich Gottwald, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 639 days.

(21) Appl. No.: 10/407,764

(22) Filed: Apr. 4, 2003

(65) Prior Publication Data

US 2004/0033073 A1    Feb. 19, 2004

(30) Foreign Application Priority Data

Apr. 4, 2002    (DE) ................................. 102 14 927

(51) Int. Cl.
*H04J 14/00*    (2006.01)
(52) U.S. Cl. .................. 398/43; 398/209; 398/213; 398/101; 398/102
(58) Field of Classification Search ................ 398/209, 398/213
See application file for complete search history.

(56) References Cited

U.S. PATENT DOCUMENTS

| | | | | |
|---|---|---|---|---|
| 4,980,891 A | * | 12/1990 | Izadpanah | 372/25 |
| 5,285,305 A | * | 2/1994 | Cohen et al. | 398/31 |
| 5,457,559 A | * | 10/1995 | Saito et al. | 398/98 |
| 5,774,246 A | * | 6/1998 | Bulow | 398/45 |
| 5,880,866 A | * | 3/1999 | Stolen | 398/101 |
| 2003/0020985 A1 | * | 1/2003 | LaGasse et al. | 359/135 |

* cited by examiner

*Primary Examiner*—Kenneth Vanderpuye
*Assistant Examiner*—Kenneth Malkowski
(74) *Attorney, Agent, or Firm*—Bell, Boyd & Lloyd LLC

(57) ABSTRACT

A method of splitting an optical data signal starting with an optical data signal split into n equal data sub-signals, and an optical binary auxiliary signal with the same bit rate and phase is added to each optical data sub-signal. Each nth bit of the optical binary auxiliary has a higher level, with the phases of each of the n optical auxiliary signals showing a relative displacement of one bit. As a result, n aggregate signals are generated, each of which is fed to a decision-maker. A decision-maker threshold is set above the amplitude of the data sub-signal and below the amplitude of the aggregate signal. Each decision-maker, therefore, emits an electrical data signal with 1/n times the bit rate of the data signal.

12 Claims, 4 Drawing Sheets

METHOD FOR SPLITTING AN OPTICAL SIGNAL INTO A NUMBER OF ELECTRICAL DATA SIGNALS WITH LOWER BIT RATES

BACKGROUND

The present invention relates to a method for splitting an optical signal and, more particularly, splitting the optical signal into a number of electrical signals having lower bit rates than the optical signal.

Signals with high data rates over 40 Gbits/s can, at present, not yet be processed electrically. Demultiplex circuits are therefore used, which split such signals into a number of sub-signals with lower bit rates.

Known demultiplex circuits use an optical pulse source such as, for example, an optical voltage controlled oscillator, abbreviated as VCO, in conjunction with optical logic circuits, which often utilize non-linear effects in optical waveguides. In this process every nth bit is selected from the incoming signal.

Another option involves using a VCO with electro-optical transformers triggered by it such as, for example, electro-absorption modulators, abbreviated as EAM, or Mach-Zehner modulators, abbreviated as MZM. In this process too every nth bit is selected from the incoming signal.

Both arrangements have the disadvantage that they are relatively complex in structure and expensive. These arrangements are also polarization-dependent. Also a stable structure is necessary, in particular from a thermal point of view, to avoid runtime drifts, which cause bit errors.

SUMMARY

In a disclosed example, a method for splitting an optical data signal into an n number of electrical data signals having lower bit rates is disclosed. The method includes splitting the optical data signal into an n number of equal data sub-signals. A corresponding optical binary auxiliary signal is added to each of the n number of data sub-signals, each of the corresponding optical binary auxiliary signals having a same bit rate and phase as the data sub-signal to which it is added. An nth bit of each of the optical binary auxiliary signals is included having a level higher than other bits in the same optical binary auxiliary signal. Additionally, phases of each of the optical binary auxiliary signals have a relative displacement of one bit such that an n number of aggregate signals are generated. The method further includes transmitting each of the aggregate signals to a corresponding decision-maker, each decision-maker having a threshold with an amplitude greater than an amplitude of a corresponding data sub-signal and less than an amplitude of a corresponding aggregate signal such that each decision-maker emits an electrical data signal having a bit rate 1/n times a bit rate of the optical data signal.

DETAILED DESCRIPTION OF THE PRESENT EXAMPLES

Figure 1:
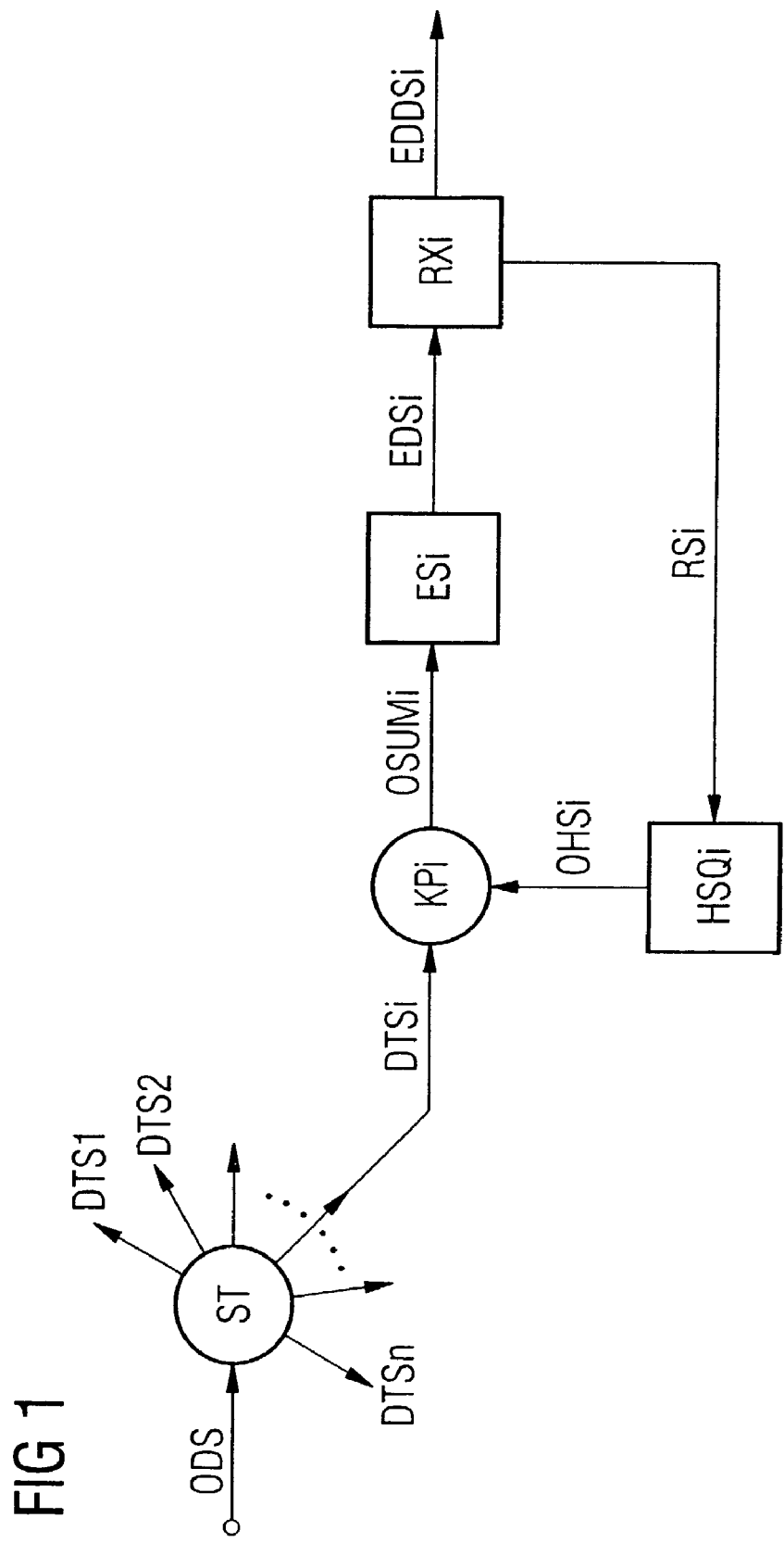
FIG. 1 illustrates a block circuit diagram of an arrangement utilized in implementing the disclosed method.

FIG. 1 shows an outline of the structure of an arrangement for implementing the present disclosed method. The optical signal ODS to be demultiplexed is fed to a signal splitter ST, which splits the signal into n data sub-signals DTS1, DTS2, . . . , DTSn.

Each of the individual data sub-signals DTSi is fed to a respective coupler KPi. An auxiliary signal source HSQi generates an optical auxiliary signal OHSi of the same bit rate and phase as the data sub-signal DTSi, which is also fed to the coupler KPi. Every nth bit of the auxiliary signal OHSi has a higher level. The phases of each of the n optical auxiliary signals show a relative displacement of one bit. The coupler KPi adds together the data signal DTSi and the auxiliary signal OHSi to form an optical aggregate signal OSUMi and emits this to a decision-maker ESi.

An amplitude of the decision-maker threshold of the decision-maker ESi is above the amplitude of the data sub-signal DTSi and below the amplitude of the aggregate signal OSUMi, roughly in the center between the two amplitudes.

As only every nth bit of the optical aggregate signal OSUMi has a higher level, every decision-maker ESi emits an electrical data signal, which is 1/n of the bit rate of the optical data signal ODS. This is fed in each instance to a receiver RXi, the bandwidth of which is 1/n times the bandwidth of the optical data signal. The receiver RXi emits a demultiplexed electrical data sub-signal EDDSI at its output.

So that every auxiliary signal OHSi has the correct phase in relation to the data sub-signal DTSi, a control signal RSi is emitted by the receiver RXi and this is fed to the auxiliary signal source HSQi. Synchronization in relation to the nth bit for example takes place here in the receiver RXi using code words.

In order to avoid increased noise effects due to Amplified Spontaneous Emissions (ASE), the optical auxiliary signal is generated in a different optical domain/window from the optical data signal.

A photodiode PHDi (not shown) is used as the decision-maker ESI and its operating point is selected so that only a higher optical level, as occurs with every nth bit of the optical aggregate signal OSUMi in the event of a logical 1, produces a photocurrent, which is fed to the receiver RXi of correspondingly low bandwidth.

Figure 2:
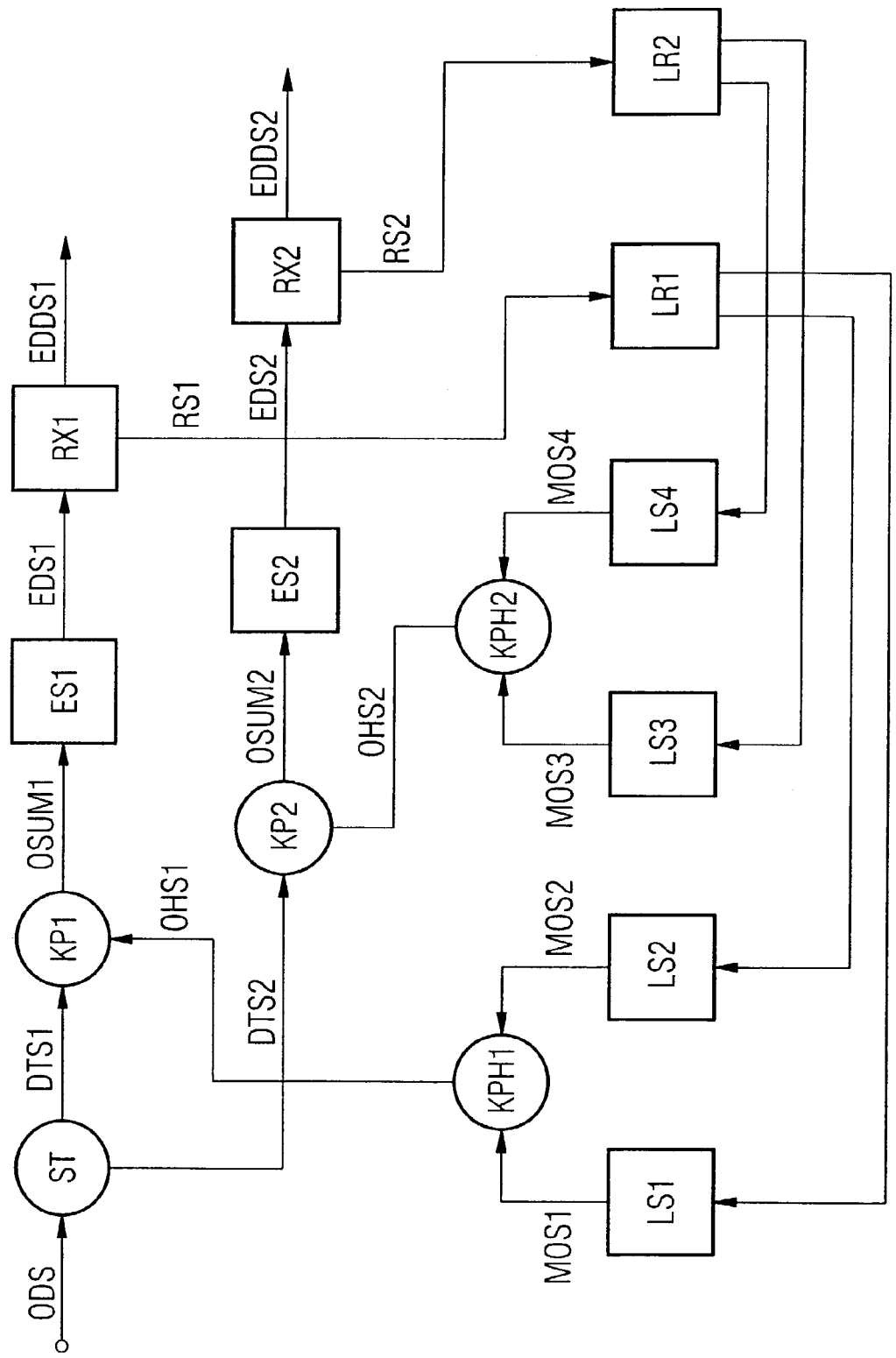
FIG. 2 illustrates a block diagram of an example arrangement utilized for implementing the disclosed method when the optical data system is split into two electrical signals.

A particularly advantageous implementation results when the optical data signal is split into two electrical signals, as shown in FIG. 2. Each of the optical auxiliary signals OHS1 and OHS2 can then be generated by the modulation or superimposition of two monochromatic optical signals MOS1 and MOS2 or MOS3 and MOS4. These signals can be generated by lasers LS1, . . . , LS4. The frequency-accurate and phase-accurate auxiliary signal OHSi can advantageously be controlled by means of a laser control LR1 or LR2.

The two monochromatic optical signals MOS1 and MOS2 or MOS3 and MOS4 are then fed to a coupler KPH1 or KPH2, which emits the optical auxiliary signal OHS1 or OHS2.

Figure 3:
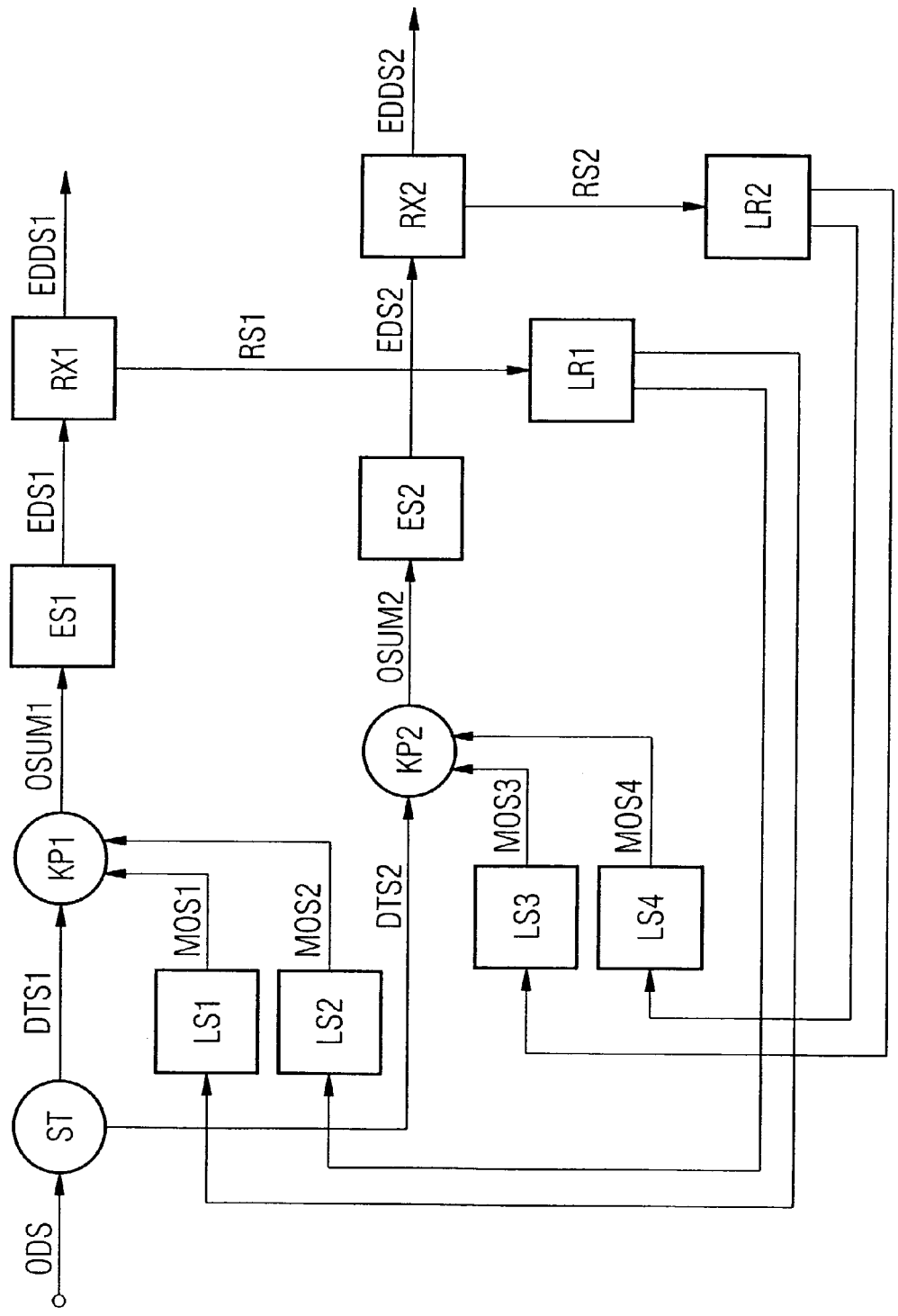
FIG. 3 illustrates a block diagram of an example arrangement for an optical data signal split into two electrical signals where monochromatic optical signals are fed directly to a coupler connected directly to a splitter.

FIG. 3, in principle, illustrates a same arrangement as FIG. 2, with the difference that the monochromatic optical signals MOS1 and MOS2 or MOS3 and MOS4 are fed directly to the coupler KP1 or KP2.

Figure 4:
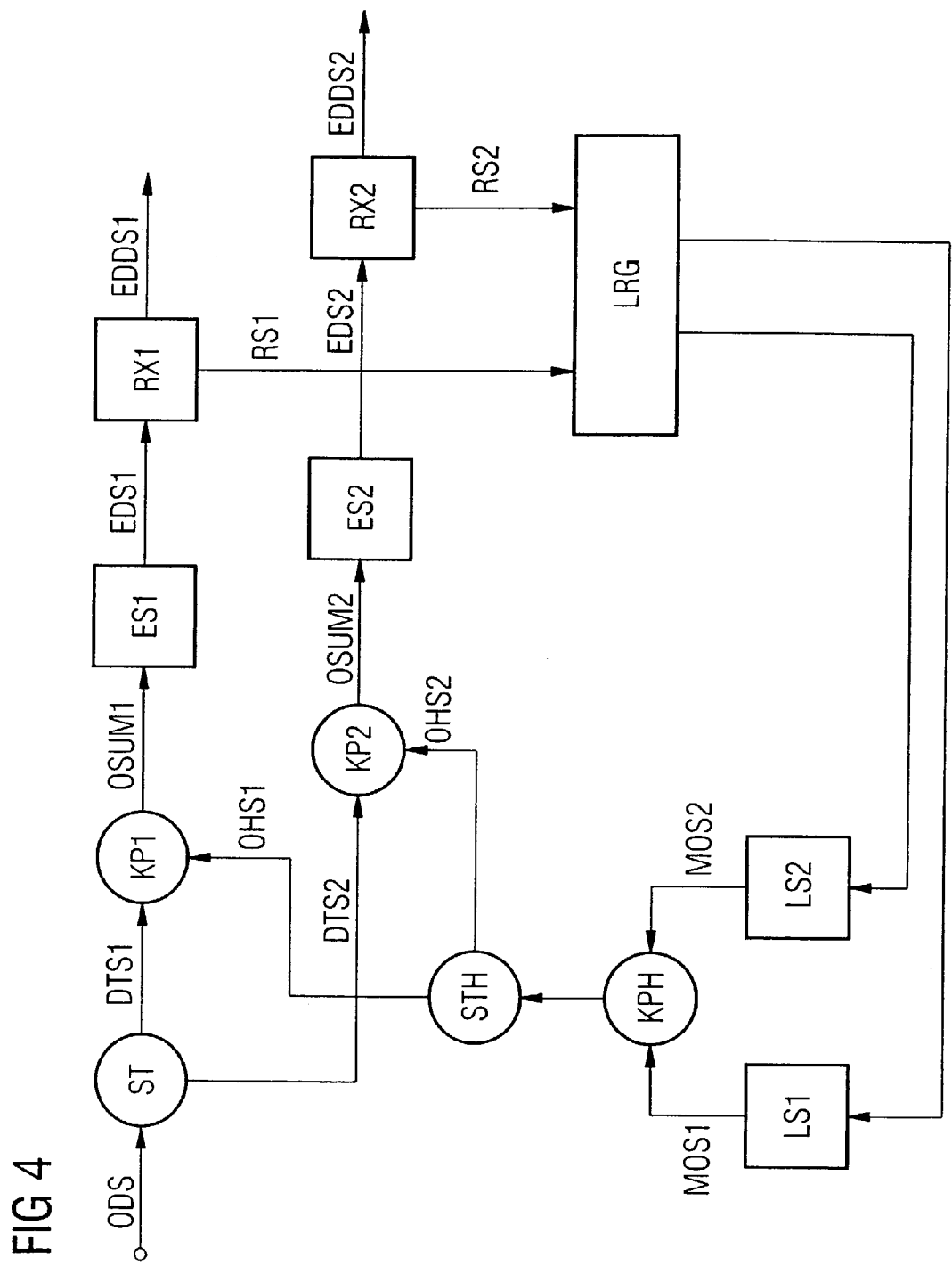
FIG. 4 illustrates a block diagram of an example arrangement where auxiliary signals are generated with lasers under common laser control and employing a signal splitter.

FIG. 4, in principle, illustrates a same arrangement as FIG. 2 with the difference that the second auxiliary signal OHS2 is generated by delaying the first auxiliary signal OHS1 for the duration of one bit. In this example, only two lasers LS1 and LS2 are required, which have a common laser control LRG. The monochromatic optical signals MOS1 and MOS2 emitted by the lasers LS1 and LS2 are fed to a coupler KPH, the output of which is connected to the input of a signal splitter STH, which emits an optical auxiliary signal OHS1 or OHS2.

If, for example, an 80 Gbit/s signal is to be demultiplexed, one each of the auxiliary signals OHS1 and OHS2 is added to the two data sub-signals DTS1 and DTS2. The auxiliary signals OHS1 and OHS2 each have a frequency of 40 GHz. This is generated by modulation of two lasers, which have a frequency difference of 40 GHz. The absolute wavelengths of the lasers are of secondary importance here. They should be outside the wavelength range of the optical data signal, in order to avoid additional noise interference between the optical auxiliary signal and the noise background of the data signal, referred to as Amplified Spontaneous Emissions (ASE).

The present disclosed method affords demultiplexing of an optical signal using simple means. The method is neither polarization-dependent nor sensitive to runtime drifts, as the optical data signal and the auxiliary signal for bit selection are transferred to the decision-maker via a common optical waveguide and both demultiplexing and phase detection take place in the decision-maker or the same photodiode.

The use of a photodiode with an adjustable or controllable operating point allows the decision-maker and opto-electrical transformer to operate in one component.

The use of different wavelengths, preferably in different optical windows, affords no noise interference with the noise background of the data signal, referred to as amplified spontaneous emissions, abbreviated as ASE due to the absence of wavelength-related overlap means. This results in significantly less stringent requirements for the signal to noise ratio.

The use of phase control allows the data signal bits to be always optimally selected.

The use of a receiver with correspondingly limited bandwidth is simpler and, therefore, lower cost.

The disclosed method is particularly suitable for splitting the optical data signal into two electrical sub-signals, such that the pulse source can be established by superimposing two monochromatic signals, for example, from laser diodes, which is particularly simple and low cost. The use of laser diodes significantly simplifies frequency and phase control of the auxiliary signal.

Although preferred examples have been disclosed for illustrative purposes, those of ordinary skill in the art will appreciate that the scope of this patent is not limited thereto. On the contrary, this patent covers all methods and apparatus falling within the scope of the appended claims.

What is claimed is:

1. A method for splitting an optical data signal into an n number of electrical data signals having lower bit rates, the method comprising:

splitting the optical data signal into an n number of equal data sub-signals;

adding a corresponding optical binary auxiliary signal to each of the n number of data sub-signals, each corresponding optical binary auxiliary signal having a same bit rate and phase as the data sub-signal to which it is added, wherein an nth bit of each of the optical binary auxiliary signals has a level higher than other bits in the optical binary auxiliary signal, and phases of each of the optical binary auxiliary signals have a relative displacement of one bit, such that an n number of aggregate signals are generated; and transmitting each of the aggregate signals to a corresponding decision-maker, each decision-maker having a threshold with an amplitude greater than an amplitude of a corresponding data sub-signal and less than an amplitude of a corresponding aggregate signal such that each decision-maker emits an electrical data signal having a bit rate 1/n times a bit rate of the optical data signal.

2. A method as defined in claim 1, wherein at least one decision-maker is configured as a photodiode with an adjustable or controllable operating point.

3. A method as defined in claim 1 wherein the wavelengths of the optical binary auxiliary signals are not equal to the wavelengths of the corresponding optical data sub-signals.

4. A method as defined in claim 1, wherein the wavelengths of the optical binary auxiliary signals are in a different optical window from the wavelengths of the corresponding optical data sub-signals.

5. A method as defined in claim 1, further comprising:

controlling a phase difference between each of the data sub-signals and the corresponding optical binary auxiliary signal.

6. A method as defined in claim 1, further comprising: finding each of the electrical data signals fed to a corresponding receiver having a bandwidth 1/n times the bandwidth of the optical data signal.

7. A method as defined in claim 1, wherein the optical data signal is split into two data sub-signals.

8. A method as defined in claim 7, wherein at least one auxiliary signal is generated by modulation or superimposition of two monochromatic optical signals.

9. A method as defined in claim 8, wherein a frequency-accurate and phase-accurate optical auxiliary signal is generated by controlling at least one of the frequency and the phase of at least one of the first and second monochromatic optical signals.

10. A method as defined in claim 8, wherein the monochromatic optical signals are generated by laser.

11. A method as defined in claim 1, wherein the amplitude of the threshold is centered between the amplitude of the corresponding aggregate signal and the amplitude of the corresponding data sub-signal.

12. A method for splitting an optical data signal into at least two electrical data signals having lower bit rates, the method comprising:

splitting the optical data signal into first and second data sub-signals;

adding first and second optical binary auxiliary signals to the first and second data sub-signals, respectively, the first and second optical binary auxiliary signals respectively having a same bit rate and phase of the first and second data sub-signals and an $n^{th}$ bit of each of the first and second optical binary auxiliary signals set to have a higher level than the remaining bits in the first and second optical binary auxiliary signals, so that the phases of each of the first and second optical binary auxiliary signals demonstrate a relative displacement of one bit such that first and second aggregate signals are respectively generated as a result of adding the first and second optical binary auxiliary signals to the first and second data sub-signals;

setting a first decision threshold to a level that is greater than an amplitude of the first data sub-signal and less than an amplitude of the first aggregate signal and setting a second decision threshold to a level that is above an amplitude of the second data sub-signal and below an amplitude of the second aggregate signal in order to respectively generate first and second electrical data signals having a bit rate 1/n time the bit rate of first and second data signals, respectively.

* * * * *